United States Patent [19]

Simpson et al.

[11] 4,414,112

[45] Nov. 8, 1983

[54] OIL/WATER SEPARATOR

[75] Inventors: Robert E. Simpson, Dallas; Billy H. Amstead, Austin; Charles R. Barden, Bastrop, all of Tex.

[73] Assignee: Recovery Technology Associates, Daingerfield, Tex.

[21] Appl. No.: 343,995

[22] Filed: Jan. 29, 1982

[51] Int. Cl.³ .............................................. B04C 5/00
[52] U.S. Cl. ................................ 210/512.1; 209/144; 209/211
[58] Field of Search ................... 210/512.1, 512.3, 787, 210/788, 789; 209/144, 211

[56] References Cited
U.S. PATENT DOCUMENTS
2,816,490 12/1957 Boadway et al. ................ 210/512.1

*Primary Examiner*—Frank Sever
*Attorney, Agent, or Firm*—Donald E. Degling

[57] ABSTRACT

A separator for liquids, such as oil and water, is provided. The separator comprises a tangentially-fed, cylindrical vortex generating chamber which communicates axially with a conical accelerating chamber so as to form an axially disposed vortex of the lower density liquid surrounded by the higher density liquid. Both liquids flow generally downwardly in a helical flow pattern and leave the liquid separator by gravity, the lower density liquid flowing freely through an axially disposed vortex finding tube. The axially disposed vortex finding tube may be adjusted in a plane normal to the axis of the accelerating chamber as well as in the direction of the axis of the accelerating chamber. Additionally, the vortex finding tube may contain a flexible section to permit oscillation of the mouth of the vortex finding tube in a plane normal to the axis of the accelerating chamber.

20 Claims, 5 Drawing Figures

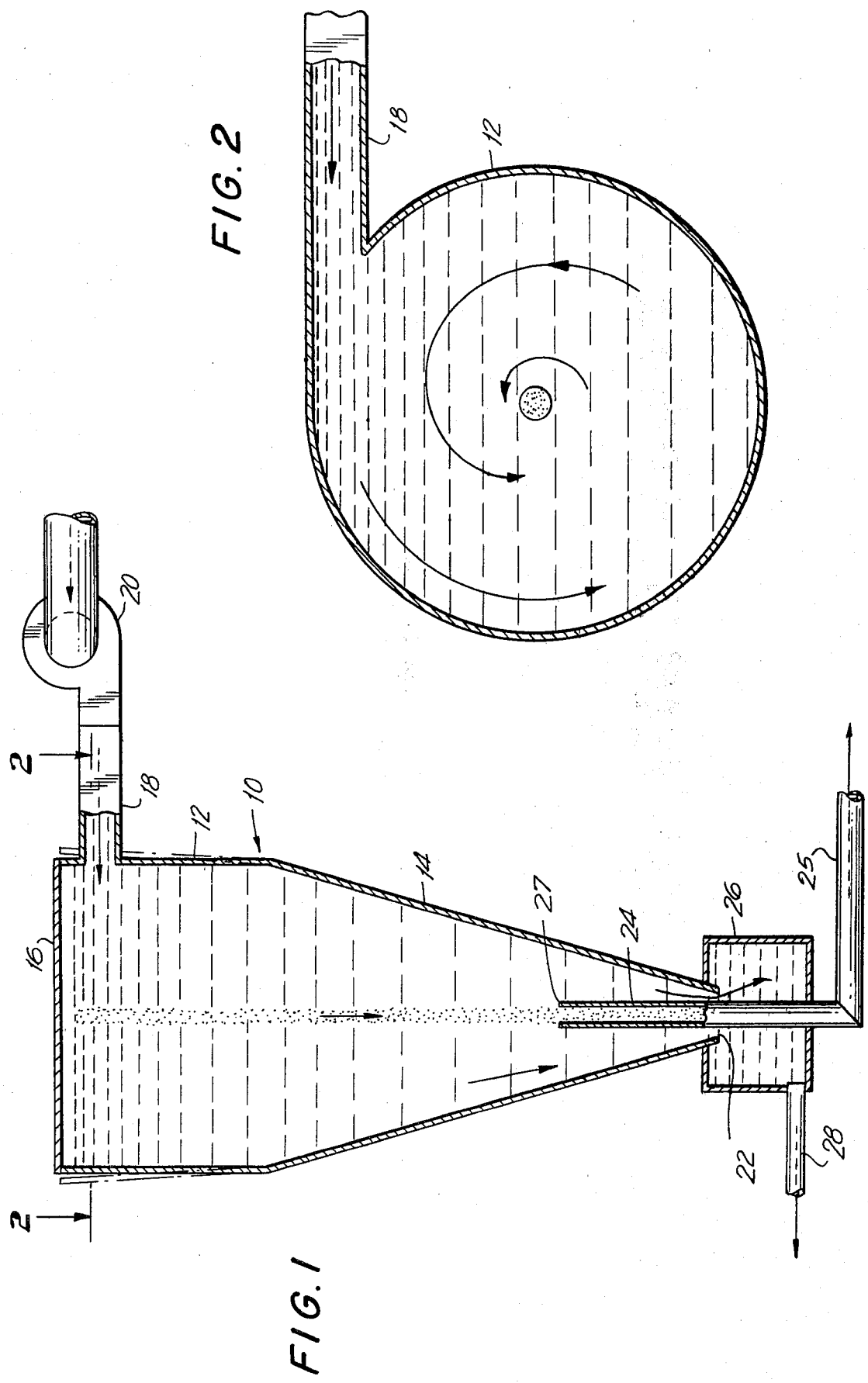

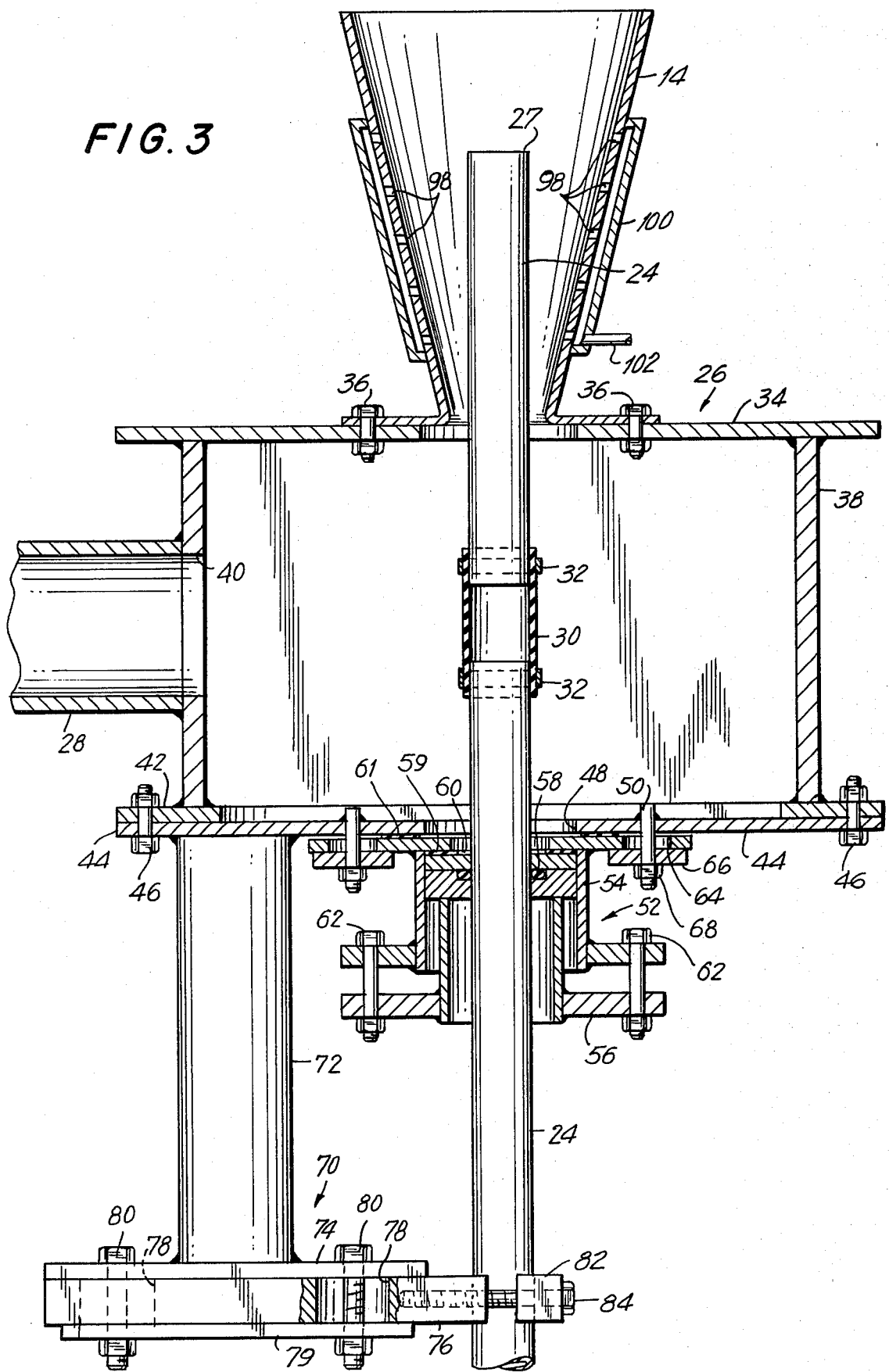

OIL/WATER SEPARATOR

BACKGROUND OF THE INVENTION

1. Field of the Invention

The present invention relates generally to liquid separators of the hydrocyclone type. More particularly, it relates to a vertically disposed, generally conical vortex separator incorporating a gravity discharge of the separated liquids.

2. Prior Art

The problem of separating liquids, such as oil and water, has been addressed by a number of workers in the field and many different separating devices have been proposed. The present invention is directed toward a class of separators generally known as hydrocyclones which separate liquids having different densities through the use of centripetal and centrifugal forces.

A method for free falling, whirling vortex separation is disclosed in Hunter U.S. Pat. No. 2,538,870 and Sweeney U.S. Pat. No. 3,215,272, while a mechanically enclosed "vortex" is shown in the Vicard U.S. Pat. No. 2,719,631.

Fontein U.S. Pat. No. 2,769,546 discloses apparatus for separating liquids based upon their viscosity by setting up a liquid vortex in a rotation chamber and delivering the flow to one or more discharge receiving mouths. Whatley et al. U.S. Pat. No. 3,052,361 discloses a series of cylindrical or conical hydrocyclones wherein the lighter liquid rises upwardly along the axis, while the heavier liquid moves toward the wall and thence downwardly.

Sliepcevich et al. U.S. Pat. No. 3,471,018 discloses a centrifugal cyclone type liquid/liquid separator wherein the wetting characteristics of the surfaces are adjusted to match the properties of the liquids being separated. A somewhat similar approach appears in Snavely, Jr. U.S. Pat. No. 3,489,680 which suggests the use of a coalescing membrane in a hydrocyclone to break up an emulsion of oil and water.

Mensing et al. U.S. Pat. Nos. 3,743,095 and 3,743,102 and Mesing [sic] U.S. Pat. No. 3,780,862 relate to a method and apparatus for separating oil and water comprising an horizontally disposed high length-to-diameter ratio cylindrical vortex tube.

Oil/water separators designed to be drawn or pushed over water-base oil spills are shown in Valibouse et al. U.S. Pat. No. 3,789,988; Mourlon et al. U.S. Pat. No. 3,635,342; Pichon U.S. Pat. No. 4,111,809; Stagemeyer et al. U.S. Pat. No. 4,139,470; and Nebeker et al. U.S. Pat. No. 4,142,972.

Oil/water separators designed to treat bilgewater on board ship are also known. However, despite the premium on weight and size associated with shipboard operations, most of the oil/water separators designed for shipboard use appear to be relatively large and complex. See, e.g., Hapgood U.S. Pat. No. 1,481,901; Meurk U.S. Pat. No. 1,921,689; and Murphy et al. U.S. Pat. No. 4,139,463.

SUMMARY OF THE INVENTION

In accordance with the present invention, a simple and effective apparatus for separating liquids, such as oil and water, is provided. First, a substantially cylindrical vertically disposed hydrocyclone section designed to establish a vortex action when running full is provided. The exit of the substantially cylindrical section communicates with a vertically disposed accelerator section which is generally conical in shape. A sized orifice is formed at the apex of the accelerator section for the egress of the higher density liquid. A sized vortex finder is positioned generally vertically within the accelerator chamber along the axis thereof so as to contact the vortex of lower density liquid and convey it by gravity through the lower end of the accelerator chamber.

The energy required to drive the system is provided, for example, by a pump which delivers the mixture of liquids, such as oil and water, to the tangential entry of the cylindrical portion of the hydrocyclone, while separated liquids are drained from the accelerator section of the hydrocyclone by gravity. In accordance with further features of the apparatus, both liquids flow through the system generally co-current. The light density liquid is formed into a free standing vortex and removed at a point where the centrifugal separating forces are maximum by a vortex finder tube positioned substantially at the interface of the low and high density liquids. The vortex finder may preferably be formed with a shaped mouth so as to minimize interference with the fluid flow and may also be mounted so as to be adjustable in both the horizontal and vertical directions. Additionally it may be flexibly mounted so as to have limited horizontal movement.

BRIEF DESCRIPTION OF THE DRAWINGS

Additional advantages of the novel combination according to the present invention will become apparent from the following detailed description of the invention and the accompanying drawings in which:

FIG. 1 is an elevational view partly in section of an improved liquid/liquid separator in accordance with the present invention.

FIG. 2 is a cross-sectional view taken along line 2—2 of FIG. 1.

FIG. 3 is a fragmentary view showing a sliding joint for the vortex finder tube and a flexible section in the vortex finder tube.

DETAILED DESCRIPTION OF THE INVENTION

Figure 4:
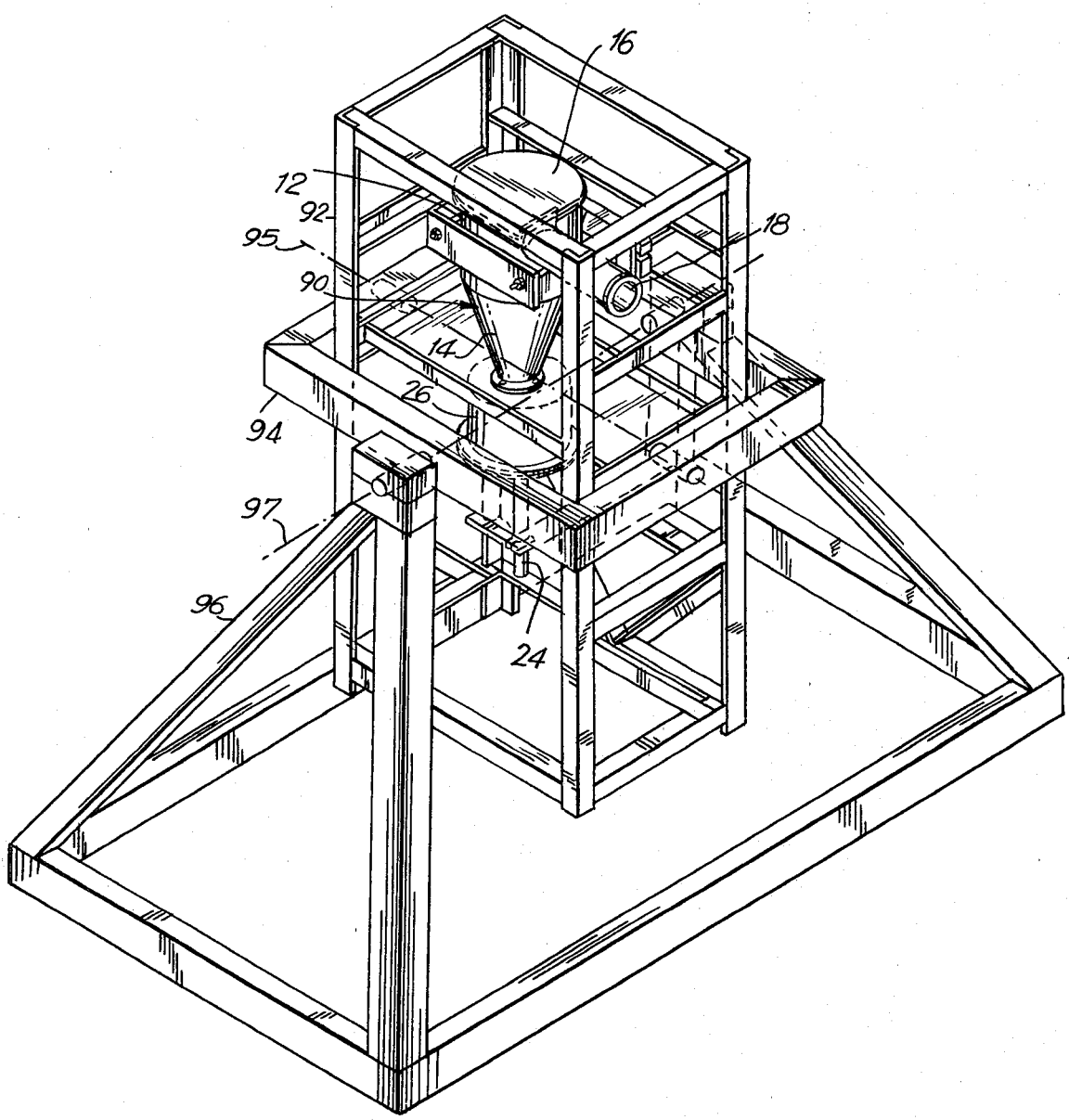
FIG. 4 is a perspective view of a separator in accordance with the present invention mounted in gimbals for shipboard operations.

Referring first to FIGS. 1 and 2, the body of the liquid/liquid separating apparatus in accordance with the present invention is indicated by the reference character 10 and comprises a generally cylindrical vortex generating chamber 12 and a conical accelerating chamber 14 affixed to the lower edge of the vortex generating chamber 12. Preferably, the conical accelerating chamber is formed with a half-angle or generating angle in the range of 13° to 16°, e.g. about 15°. The body 10 may be formed from sheet metal or plastic material or may be cast metal or plastic. If desired, the body 10 may be formed from a transparent or translucent material. In general, the material selected for the body 10 must be compatible with the liquids to be separated. In addition, the inside surface should be smooth and free of obstructions so as to minimize frictional losses. If desired, the inside surfaces of the vortex generating chamber and accelerating chamber may be coated with an antifriction material, such as an epoxy resin, which reduces the coefficient of friction between the inside surfaces and the liquid in contact with those surfaces.

A circular top 16 may be removably fitted to the top of the vortex generating chamber 12 by means of appropriate fasteners (not shown). The top 16 may be formed from the same material as the body 10 or a transparent or translucent material may be used to facilitate observation of the separating process.

Near the top of the vortex generating chamber a tangentially disposed entry duct 18 is provided. The duct 18 is preferably rectangular in cross-section with its vertical dimension larger than its horizontal dimension whereby the incoming mixture of liquids to be separated is delivered closely and smoothly to the inside surface of the vortex generating chamber. A pump 20, which may conveniently be a centrifugal pump, communicates with the duct 18 and supplies the requisite energy to drive the system.

The sides of the vortex generating chamber 12 may, alternatively, be formed to converge slightly in the direction of the accelerating chamber 14 as suggested by the phantom lines in FIG. 1. Such convergence may be on the order of 1° to 3° and serves to promote helical flow of the entering mixture of liquids.

The lower end or apex of the conical accelerating chamber 14 is truncated to form an orifice 22 having a diameter between 10 and 15 percent of the maximum diameter of the separating chamber, but preferably about 12.5 percent. A vortex finding tube 24 is positioned vertically through the orifice 22 substantially on the axis of the accelerating chamber 14. Preferably, the tube 24 is formed with relatively thin walls, e.g., approximately 0.0625 inch for a tubing having an outside diameter of 0.875 inch so as to minimize the disturbance induced within the accelerating chamber 14. The mouth 27 of the tube 24 may be chamfered to further this purpose. The outside diameter of the tube 24 is sized to be between about 50 and 75 percent of the diameter of the orifice 22. Suitable collecting means 25 communicate with the vortex finding tube 24.

Applicants have found that the vertical location of the tube 24 is critical to the operation of the separator. More particularly, applicants have discovered that the effectiveness of the separator according to the present invention is significantly improved when the mouth is maintained between one-half to about one-third of the height of the accelerating chamber.

A collecting means 26 is formed around the apex of the accelerating chamber 14 so as to receive the orifice 22 and to collect, by gravity, the liquid flowing through the orifice 22. A drain pipe 28 drains the collecting means 26 by gravity. Of course, a pump may be placed in communication with the drain pipe 28, if desired.

In operation, the mixture of liquids to be separated, e.g., oil and water, is pumped at a high velocity into the vortex generating chamber 12, where a helical flow pattern is generated. This helical flow pattern continues in the conical accelerating chamber 14 as both chambers are filled with the liquid mixture. Due to the rapid helical flow, a radial buoyancy or centripetal force acting toward the axis of the separator, a normal or centrifugal force acting away from the axis of the separator, and a drag or frictional force acting away from the axis of the separator are associated with each droplet of oil or lower density liquid in the oil/water mixture. The resultant of these forces directs the oil, or lower density liquid, toward the axis of the separator, while the water, or higher density liquid, flows toward the outer wall of the separator.

Applicants have discovered that apparatus in accordance with the present invention can efficiently separate oil from oil/water mixtures containing about 2 percent or more oil at a mixture flow rate in the range of 20 to 30 gallons per minute, preferably about 25 gallons per minute when using a separator having a maximum diameter of only 10 inches. In repeated tests, applicants have been able to draw samples from the tube 24 which assayed about 94 percent oil. Such samples contained between 45 and 70 percent of the total amount of the oil originally contained in the liquid mixture.

Such a high degree of separation is believed to be related to the relatively small size of the apparatus and the relatively high velocities which are thereby induced as a result of the flow rates employed. In addition, it is believed that the conical form of the accelerating chamber provides an increased separating force as the quantity of oil to be separated decreases. Finally, the use of aerodynamic forms and a gravity discharge permit the liquids to assume a free flow shape with minimum interference from structural parts of the apparatus. In this regard, the tube 24 is designed to enter the accelerating chamber from the bottom and reach a point where the separating forces are at a maximum, and the oil may be freely drawn off. While it is feasible to mount the tube 24 precisely on the axis of the separator, it may be advantageous to mount the tube so that it is free to move in a plane normal to the separator axis so as to follow the more or less random, but cyclical, oscillation of the central oil vortex formed in the separator. Such oscillatory flexibility may be provided by the sliding-joint and flexible section shown in FIG. 3.

FIG. 3 shows in greater detail the apparatus of FIG. 1 wherein the vortex finding tube 24 is provided with a flexible section 30 affixed at each end thereof to the vortex finding tube 24 by hose clamps 32. This construction permits the mouth 27 of the vortex finding tube 24 to wobble or oscillate so as to follow the natural oscillations of the free vortex within the accelerating chamber 14.

FIG. 3 also illustrates means to provide both horizontal and vertical adjustment of the vortex finding tube 24. The lower end of the accelerating chamber 14 is affixed to the top plate 34 of the collecting means 26 by a plurality of bolts 36 or other appropriate fasteners. The body of the collecting means 26 may be formed by a cylindrical plate 38 welded or otherwise affixed to the top plate 34. An orifice 40 is provided in the plate 38 to which the drain pipe 28 may be welded. A flange 42 may be welded to the lower periphery of the cylindrical plate 38. Bottom plate 44 is fastened to the flange 42 by a plurality of bolts 46 or other fasteners to complete the collecting means 26. Bottom plate 44 is provided with a central orifice 48 substantially larger in diameter than the diameter of the vortex finding tube 24. A plurality of studs 50 may be welded to the bottom plate 44 around the central orifice 48 to provide means for adjustably fastening the vortex finding tube holder assembly 52 to the bottom plate 44. The vortex finding tube holder assembly 52 comprises two flange units 54, 56 which, together with O-ring 58, gasket 59, seal plate 60, gasket 61, and bolts 62 form a sliding seal for the vortex finding tube 24. Flange unit 54 is provided with enlarged holes 64 which register with the studs 50 and, together with washers 66 and nuts 68, adjustably fasten the vortex finding tube holder assembly 52 to the bottom plate 44. It will be understood that the vortex tube may be adjusted in a horizontal plane within a limited region encompassing the axis of accelerating chamber 14.

Vertical adjustment of the vortex finding tube 24 is provided by the vertical adjustment assembly 70 which comprises a tube 72 welded at one end to the bottom plate 44 and at the other end to a plate 74. A plate 76 having elongated slots 78 formed therein is locked to the plate 74 by plate 79 and bolts 80. The vortex finding tube 24 is clamped to one end of the plate 76 by crosshead 82 and capscrews 84. It will be appreciated that vertical adjustment of the vortex finding tube 24 may be made merely by loosening the capscrews 84 and sliding the tube to the desired vertical location through the holder assembly 52. For horizontal adjustment of the vortex finding tube 24, it is necessary to loosen both the nuts 68 on the studs 50 and the bolts 80. It will, therefore, be appreciated that vertical and horizontal adjustments may be made independent of each other in order to achieve precise and accurate location of the mouth 27 of the vortex finding tube 24 within the accelerating chamber 14.

While three separate and independent adjusting means have been shown, it will be understood that all three adjusting means need not be incorporated into a particular separator, though, for maximum flexibility, it is preferred to use all of these means or their equivalents.

Applicants have determined that the generally cylindrical vortex generating chamber 12 should comprise about 22 to 25 percent of the total height of the separator while the accelerating chamber 14 comprises about 75 percent of the total height. The generally cylindrical vortex generating chamber 12 may be tapered at an angle of about 1.5° to 3°, while the conical accelerator may be tapered, preferably in the range of 13° to 16°, e.g. about 15°. The ratio of the area of the exit orifice 22 to the maximum area of the separator may be in the range of 1:50 to 1:70 with a ratio of 1:64 preferred.

It will be appreciated that the apparatus according to the present invention has a relatively large separating capacity for its size and weight and is thus well adapted for shipboard use where space is at a premium and excess weight is undesirable. However, where shipboard use is contemplated, it may be desirable to mount the separating unit comprising the vortex generator and the conical accelerator in gimbal rings so that the separating unit may remain substantially vertical during operation despite the movements of the ship. It will be understood that the entrance duct 18, the collecting means 25 and exit duct 28 may require flexible sections so as to accommodate the motion of the apparatus within the gimbals.

A gimbal-mounted separator for shipboard use is shown in FIG. 4. The separator 90 is affixed to inner gimbal frame 92 which is journalled into the outer gimbal ring 94 along a first axis 95 of the outer gimbal ring 94. The outer gimbal ring 94 is, in turn, journalled into the frame 96 along a second axis 97 of the outer gimbal ring 94, which axis is normal to the first axis of the outer gimbal ring 94. The frame 96 may be affixed to a structural member of the ship or other movable platform on which the assembly is to be used. Appropriate flexible connections are provided for the liquid inlet and outlet ducts so as to permit relatively free movement of the separator 90 with respect to the frame 96. It will be understood that when a gimbal mounting is used, the separator axis will remain substantially vertical even when the frame 96 may have a movement comprising some combination of rolling and pitching.

Figure 5:
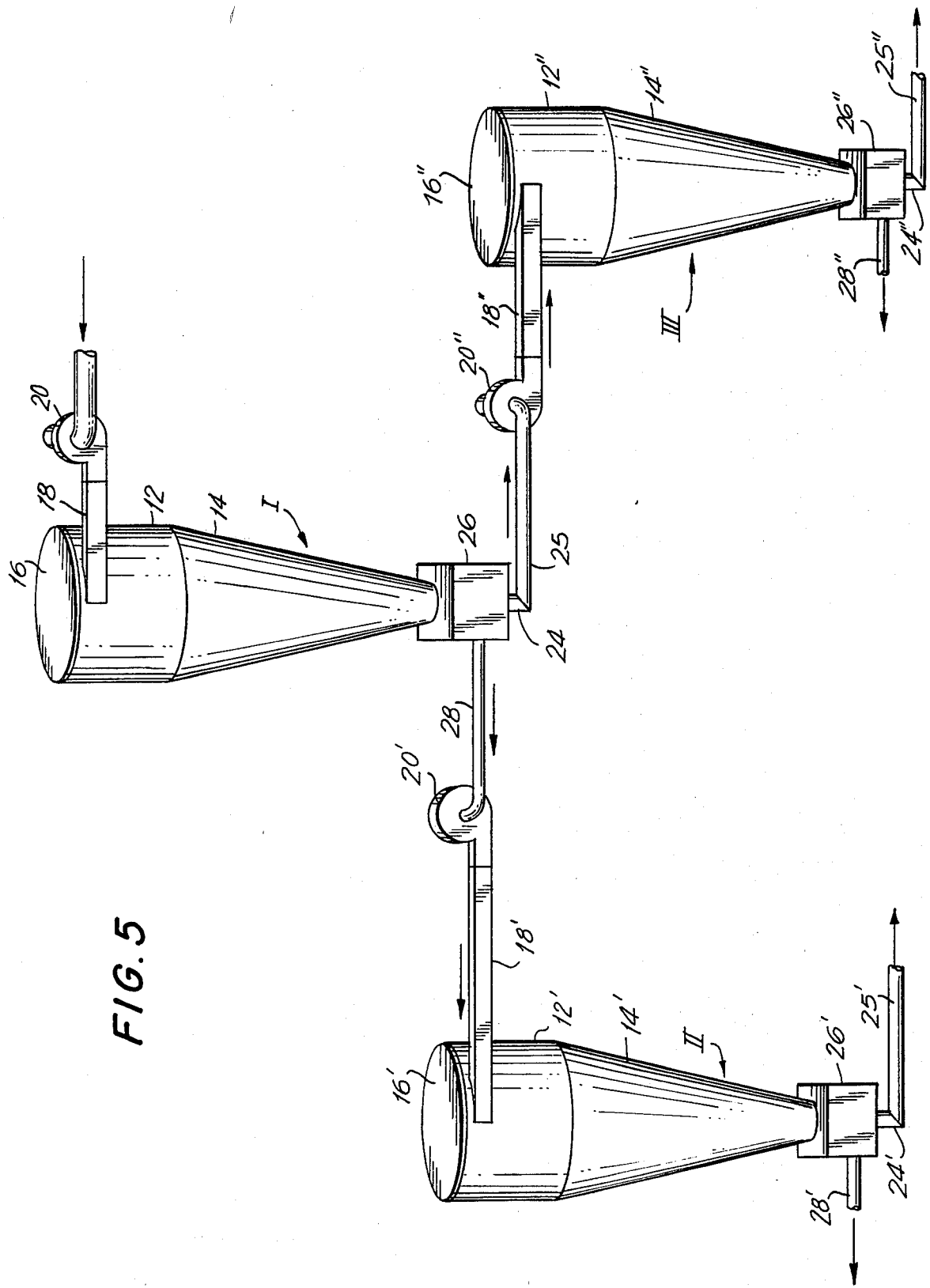
FIG. 5 is a schematic representation of three improved liquid/liquid separators according to the present invention arranged in a series-parallel manner for improved performance.

Although, as set forth above, the separator in accordance with the present invention is highly effective, even greater separation efficiency can be attained by cascading several separating units in a series or series-parallel arrangement. One such arrangement is illustrated in FIG. 5 which shows three separating units functionally identical to that shown in FIGS. 1, 2 and 3, respectively denoted as I, II, and III, connected in a series-parallel arrangement.

As noted above, if a mixture of oil and water is introduced through pump 20 and duct 18 into the vortex generator 12 of separating unit I and thence into the accelerator 14, the flow through the collecting means 25 may comprise as much as 90 to 95 percent oil, whereas the flow through pipe 28 will comprise the balance of the oil and almost all of the water. Each of these fractions may be further processed in separating units II and III. As shown in FIG. 5, the oil-rich fraction from separating unit I may be treated in separating unit III. Because the feed stock for separating unit III is heavily weighted toward the lighter density liquid, i.e., oil, it may be convenient to enlarge the vortex finding tube 24″ relative to the orifice (not shown) of separator III. In any event, almost all of the relatively small quantity of water introduced in the duct 18″ will appear in the flow through the pipe 28″ so that the oil delivered by collecting means 25″ will be substantially free of water.

In like manner, water containing a very reduced amount of oil is delivered from pipe 28 of separating unit I to the feed pipe 18′ of separating unit II. Because the feed to separating unit II is already low in oil, the dense component, i.e., water, leaving separator II through pipe 28′ will be substantially free of oil, all of which oil, together with some water, will appear in the central vortex flow withdrawn through pipe 24′.

It will be appreciated that the second stage of separation provides one stream of substantially pure oil through collecting means 25″, one stream of substantially pure water through pipe 28′ and two streams comprising oil-water mixtures through collecting means 25′ and pipe 28″. These latter two streams may conveniently be combined and reprocessed through separating unit I along with additional quantities of the oil-water mixture.

It will also be understood that separating units may be cascaded in series so that further treatment is provided to only one of the streams delivered from the initial treating unit. Such an operation may be particularly desirable in treating bilgewater or waterborne oil spills. In such an operation, the first stage may be designed to produce a concentrated oil-water mixture and water by using a vortex finding tube 24 that is relatively larger than the diameter of the central oil vortex. As the water drawn from the outer surface of the separator is substantially free of oil, such water can be dumped, thus reducing by a major factor the amount of liquid subsequently to be treated. Thus, the subsequent treatment stage may employ smaller equipment or, if desired, two or more primary separating units can be used as the feed for a single secondary unit.

The diameter of the central free vortex comprising, essentially, the lower density material, will, of course, depend on the proportion or concentration of the lower density material, i.e., oil, in the mixture. It will, therefore, be understood that separating efficiency of the apparatus is a function first of the ability of the apparatus to collect the lower density material into a free central vortex and, second, the ability to separate this vortex from the higher density liquid. The first condition may be satisfied by matching the liquid flow to the size of the separator. In this regard, applicants have found that adequate separation of oil and water may be attained when a mixture flow of 20 to 30 gallons per minute is used in a separator having a maximum diameter of about 10 inches. Those skilled in the art will appreciate that the separating force depends upon the relative densities of the two liquids, the diameter of the separating chamber, and the velocity of the fluid within the separating apparatus. As for the second condition, the purity of the lower density material is enhanced by selecting a vortex finding tube diameter smaller than the diameter of the free vortex, while the purity of the higher density material is enhanced by selecting a vortex tube diameter larger than the free vortex. To maintain a constant separation efficiency, it is apparent that the composition of the entering liquid mixture should remain constant.

Those skilled in the art will also recognize that various changes can be made in the apparatus in accordance with the present invention. For example, the tube 24 may be made in several interchangeable sizes so as to vary the performance of the apparatus. Another variation is to provide a series of weep holes 98 in the walls of the separating chamber 14 communicating with a jacket 100 and a drain 102 which comprise a collecting means for the water passing through the weep holes 98 as shown in FIG. 3. As the water passing through the weep holes 98 is the water furthest from the free vortex of oil, it will be substantially free of oil. The water from the weep holes 98 which leaves the unit via the drain 102 may be combined with the water in drain pipe 28, if desired.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A separator comprising elements designed and positioned to separate a feed mixture consisting essentially of liquids of differing densities including a substantially cylindrical vortex generating chamber having a vertical axis, a liquid entry duct communicating at one end tangentially with said vortex generating chamber at a point near the upper edge of said vortex generating chamber, pump means having inlet and outlet ports, the outlet port of said pump means communicating with the other end of said liquid entry duct, a conical truncated accelerating chamber affixed at its larger end coaxially to the bottom of said vortex generating chamber and having its truncated apex comprising an orifice directed downwardly, a thin-walled vortex finding tube extending through said orifice and within said accelerating chamber substantially along the vertical axis of said accelerating chamber a distance into said accelerating chamber sufficient to provide separating efficiencies up to 94%, first liquid collecting means communicating with said orifice and second liquid collecting means communicating with said vortex finding tube.

2. A liquid separator as set forth in claim 1 in which said vortex finding tube extends substantially along the axis of said accelerating chamber a distance between one-third and one-half the height of said accelerating chamber.

3. A liquid separator as set forth in claim 1 in which the diameter of the vortex finding tube is between 50 and 75 percent of the diameter of said orifice.

4. A liquid separator as set forth in claim 3 in which the accelerating chamber is tapered at an angle in the range of 13° to 16°.

5. A liquid separator as set forth in claim 4 in which the vortex generating chamber is tapered at an angle in the range of 1.5° to 3°.

6. A liquid separator as set forth in claim 1 in which the liquid entry duct is formed with a rectangular cross section and communicates tangentially with said vortex generating chamber adjacent the upper edge of said vortex generating chamber.

7. A liquid separator as set forth in claim 1 in which said vortex finding tube is adjustable in a plane normal to the axis of said accelerating chamber.

8. A liquid separator as set forth in claim 1 in which said vortex finding tube is adjustable in the direction of the axis of said accelerating chamber.

9. A liquid separator as set forth in claim 8 and in which said vortex finding tube is also adjustable in a plane normal to the axis of said accelerating chamber.

10. A liquid separator as set forth in claim 1 in which said vortex finding tube contains a flexible section.

11. A liquid separator as set forth in claim 1 and comprising, in addition, a plurality of weep holes formed in the lower portion of said accelerating chamber and third collecting means associated with said weep holes.

12. A liquid separator as set forth in claim 11 in which said third collecting means communicate with said first collecting means.

13. A liquid separator as set forth in claim 1, wherein the inside surfaces of the vortex generating chamber and the accelerating chamber are coated with an antifriction material to reduce the coefficient of friction between said inside surfaces and the liquid in contact therewith.

14. A liquid separator as set forth in claim 13, wherein the antifriction material is an epoxy resin.

15. A liquid separator as set forth in claim 1, wherein said generating chamber is provided with a top fabricated from a translucent material whereby the liquid vortex within the separator may be observed during operation.

16. A liquid separator as set forth in claim 1, wherein said accelerating chamber is formed from a translucent material to facilitate observation of the vortex within the separator during operation.

17. A liquid separator as set forth in claim 1 and comprising, in addition, a second liquid separator, said second liquid separator comprising elements designed and positioned to separate a feed mixture consisting essentially of liquids of differing densities including pump means having inlet and outlet ports communicating at its inlet port with said first collecting means, a liquid entry duct having inlet and outlet ends and communicating at its inlet end with the outlet port of said pump means, a substantially cylindrical vortex generating chamber communicating tangentially with the outlet end of said entry duct at a point near the upper edge of said vortex generating chamber, a conical truncated accelerating chamber affixed at its larger end to the bottom of said vortex generating chamber and having its truncated apex comprising an orifice directed downwardly, a thin-walled vortex finding tube extending through said orifice and into said accelerating chamber substantially along the vertical axis of said accelerating chamber a distance sufficient to provide separating efficiencies up to 94%, third liquid collecting means communicating with said orifice and fourth liquid collecting means communicating with said vortex finding tube.

18. A liquid separator as set forth in claim 17 and comprising, in addition, a third liquid separator, said third liquid separator comprising elements designed and positioned to separate a feed mixture consisting essentially of liquids of differing densities including pump means having inlet and outlet ports communicating at its inlet port with said second collecting means, a liquid entry duct having inlet and outlet ends and communicating at its inlet end with the outlet port of said pump means, a substantially cylindrical vortex generating chamber communicating tangentially with the outlet end of said entry duct at a point near the upper edge of said vortex generating chamber, a conical truncated accelerating chamber affixed at its larger end to the bottom of said vortex generating chamber and having its truncated apex comprising an orifice directed downwardly, a thin-walled vortex finding tube extending through said orifice and into said accelerating chamber substantially along the vertical axis of said accelerating chamber a distance sufficient to provide separating efficiencies up to 94%, fifth liquid collecting means communicating with said orifice and sixth liquid collecting means communicating with said vortex finding tube.

19. A liquid separator as set forth in claim 18 comprising, in addition, duct means having inlet and outlet ends, the inlet end of said duct means communicating with said fourth collecting means of said second liquid separator and said third collecting means of said third liquid separator and the outlet end of said duct means communicating with the inlet port of said pump means of said liquid separator.

20. A liquid separator as set forth in claim 1 and comprising, in addition, a second liquid separator, said second liquid separator comprising elements designed and positioned to separate a feed mixture consisting essentially of liquids of differing densities including pump means having inlet and outlet ports and communicating at its inlet port with said second collecting means, a liquid entry duct having inlet and outlet ends and communicating at its inlet end with the outlet port of said pump means, a substantially cylindrical vortex generating chamber communicating tangentially with the outlet end of the entry duct at a point near the upper edge of said vortex generating chamber, a conical truncated accelerating chamber affixed at its larger end to the bottom of said vortex generating chamber and having its truncated apex comprising an orifice directed downwardly, a thin-walled vortex finding tube extending through said orifice and into said accelerating chamber substantially along the vertical axis of said accelerating chamber a distance sufficient to provide separating efficiencies up to 94%, fifth liquid collecting means communicating with said orifice and sixth liquid collecting means communicating with said second liquid collecting means.

* * * * *